(12) United States Patent
Madsen et al.

(10) Patent No.: US 10,982,659 B2
(45) Date of Patent: Apr. 20, 2021

(54) METHOD FOR OPENING A COVER PORTION OF A WIND TURBINE

(71) Applicant: Vestas Wind Systems A/S, Aarhus N. (DK)

(72) Inventors: Niels Møller Madsen, Århus C (DK); Mohanraj Kathiresan, Dindigul (IN); Gajendra Narayanachar, Chennai (IN)

(73) Assignee: Vestas Wind Systems A/S, Aarhus N. (DK)

(*) Notice: Subject to any disclaimer, the term of this patent is extended or adjusted under 35 U.S.C. 154(b) by 99 days.

(21) Appl. No.: 16/326,811

(22) PCT Filed: Aug. 29, 2017

(86) PCT No.: PCT/DK2017/050275
§ 371 (c)(1),
(2) Date: Feb. 20, 2019

(87) PCT Pub. No.: WO2018/054437
PCT Pub. Date: Mar. 29, 2018

(65) Prior Publication Data
US 2019/0226460 A1    Jul. 25, 2019

(30) Foreign Application Priority Data

Sep. 21, 2016  (IN) .............................. 201611032259

(51) Int. Cl.
*F03D 80/50* (2016.01)
*F03D 80/00* (2016.01)
*B66C 23/20* (2006.01)

(52) U.S. Cl.
CPC ............ *F03D 80/50* (2016.05); *B66C 23/207* (2013.01); *F03D 80/00* (2016.05);
(Continued)

(58) Field of Classification Search
CPC ....... F03D 80/50; F03D 80/00; B66C 23/207; F05B 2230/80; F05B 2230/61;
(Continued)

(56) References Cited

U.S. PATENT DOCUMENTS 8,104,631 B2 * 1/2012 Stegemann ............. F03D 80/50
212/179
9,670,898 B2 * 6/2017 Abolfazlian ............ F01D 25/12
(Continued)

FOREIGN PATENT DOCUMENTS

CN     102906420 A     1/2013
CN     103348132 A    10/2013
(Continued)

OTHER PUBLICATIONS

China National Intellectual Property Administration, First Notification of Office Action in CN Application No. 201780058175.X, dated Feb. 28, 2020.
(Continued)

*Primary Examiner* — J. Todd Newton
(74) *Attorney, Agent, or Firm* — Wood Herron & Evans LLP

(57) ABSTRACT

The invention provides a method for opening a cover portion (202) of a wind turbine (1) comprising a nacelle (2) mounted on top of a tower (4), the nacelle supporting a rotor (3) and a generator (104) connected to the rotor, the nacelle (2) comprising a cover (201) presenting an access opening (203), the cover portion (202) being adapted to removably cover the access opening (203), the nacelle (2) also comprising a service crane (204), a cooler (205) being mounted to the nacelle (2) on an exterior of the nacelle (2), the method comprising attaching (S1) at least one hinge tool (6) to the cover portion (202) and to the cover (201), the hinge tool (6) presenting a swing joint (603), opening (S5) by means of the
(Continued)

service crane (204) the cover portion (202) in a pivoting motion around the swing joint (603), and securing (S6) the opened cover portion (202) to the cooler (205).

29 Claims, 8 Drawing Sheets

(52) U.S. Cl.
CPC ....... *F05B 2230/61* (2013.01); *F05B 2230/80* (2013.01); *F05B 2240/14* (2013.01); *Y02B 10/30* (2013.01); *Y02E 10/72* (2013.01); *Y02P 70/50* (2015.11)

(58) Field of Classification Search
CPC ...... F05B 2240/14; Y02E 10/72; Y02P 70/50; Y02B 10/30
USPC .................................................... 416/244 R
See application file for complete search history.

(56) References Cited

U.S. PATENT DOCUMENTS

| | | | | |
|---|---|---|---|---|
| 2013/0309090 | A1* | 11/2013 | Abolfazlian | F03D 9/255 416/1 |
| 2016/0237986 | A1* | 8/2016 | Abolfazlian | F03D 13/20 |
| 2017/0022966 | A1* | 1/2017 | Therkildsen | B66C 13/16 |

FOREIGN PATENT DOCUMENTS

| | | | | |
|---|---|---|---|---|
| EP | 0372675 | A1 * | 6/1990 | ......... E05D 11/1007 |
| EP | 1677000 | A2 | 7/2006 | |
| EP | 1677001 | A2 | 7/2006 | |
| WO | 2012105971 | A1 | 8/2012 | |
| WO | 2012107049 | A1 | 8/2012 | |
| WO | WO-2012105971 | A1 * | 8/2012 | ............. F03D 80/50 |
| WO | 2013182198 | A1 | 12/2013 | |
| WO | 2014001085 | A1 | 1/2014 | |
| WO | 2015078475 | A1 | 6/2015 | |
| WO | WO-2018054437 | A1 * | 3/2018 | ............. F03D 80/00 |

OTHER PUBLICATIONS

European Patent Office, International Search Report and Written Opinion in PCT Application No. PCT/DK2017/050275, dated Jan. 22, 2018.

Danish Patent and Trademark Office, Search and Exam Report in PA 2016 70906, dated Feb. 15, 2017.

* cited by examiner

METHOD FOR OPENING A COVER PORTION OF A WIND TURBINE

TECHNICAL FIELD

The invention relates to a method for opening a cover portion of a wind turbine comprising a nacelle mounted on top of a tower, the nacelle supporting a rotor and a generator connected to the rotor, the nacelle comprising a cover presenting an access opening, the cover portion being adapted to removably cover the access opening. The invention also relates to a hinge tool for a cover portion of a wind turbine nacelle, and a nacelle for a wind turbine.

BACKGROUND

A horizontal axis wind turbine (HAWT) usually comprises a nacelle mounted on top of a tower and supporting a rotor. The nacelle normally houses a generator connected to the rotor via a main shaft and in some cases via a gearbox. In so called direct drive wind turbines, no gearbox is provided between the generator and the rotor.

With increasing sizes of wind turbines, new needs arise for service solutions facilitating actions such as component replacement. As many components are housed in the nacelle, a wind turbine operator will be faced with the need to move components into and out of the nacelle in service procedures occurring during the wind turbine lifetime. Such movements will normally involve opening or removing a hatch to expose an opening in a cover of the nacelle, through which opening the components may be moved.

Where components are large, nacelle cover hatches and opening also need to be large. Handling such hatches by hand may be difficult and even unsafe. Providing motors or similar driving power devices to handle the hatches increases the complexity and cost of the wind turbine.

EP1677001 describes a system for removing a nacelle roof cover from a wind turbine, including the use of a tool arranged to move the cover. Such a tool will need to be relatively large and therefore challenges may be provided in the handling of the tool itself. In addition, the tool adds complexity and cost for the wind turbine operator.

SUMMARY

An object of the invention is to decrease or minimise increases of the complexity and cost of wind turbines. Another object of the invention is to facilitate service related handling of nacelle hatches or cover portions in large wind turbines, without any substantial increase in complexity and cost for the wind turbine operator. A further object of the invention is to facilitate service related handling of nacelle hatches or cover portions in large wind turbines, while minimizing the safety risks for persons involved with the service operation.

The objects are reached with a method for opening a cover portion of a wind turbine comprising a nacelle mounted on top of a tower, the nacelle supporting a rotor and a generator connected to the rotor, the nacelle comprising a cover presenting an access opening, the cover portion being adapted to removably cover the access opening, the nacelle also comprising a service crane, the wind turbine also comprising a cooler mounted to the nacelle on an exterior of the nacelle, the method comprising attaching at least one hinge tool to the cover portion and to the cover, the hinge tool presenting a swing joint, opening by means of the service crane the cover portion in a pivoting motion around the swing joint, and securing the opened cover portion to the cooler. It is understood that the rotor will normally be provided with one or more blades.

As explained below, the hinge tool may decrease the complexity and cost of the wind turbine since it can be shared by a plurality of wind turbines rather than being permanently installed in all of them. As also explained below, by opening the cover portion by means of the service crane, no devices, such as motors or hydraulic cylinders, solely dedicated to provide power for the opening and closing of the cover portion are needed. Also, the power provided by the service crane for opening the cover portion, eliminates the need to service personnel to open the cover portion by hand, and thereby the safety risks for persons involved with the service operation is reduced. This means that the complexity and cost of the wind turbine may be reduced. As further explained below, by using the cooler to secure the opened cover portion, no dedicated device for securing the cover portion, such as a fastening bracket, is needed, and an increase of the wind turbine complexity is thereby avoided.

The objects are also reached with a method of opening a cover portion of a wind turbine comprising a nacelle mounted on top of a tower, the nacelle supporting a rotor and a generator connected to the rotor, the nacelle comprising a cover presenting an access opening, the cover portion being adapted to removably cover the access opening, the method comprising attaching at least one hinge tool to the cover portion and to the cover, the hinge tool presenting a swing joint. The hinge tool may provide an auxiliary hinge for the cover portion, installed temporarily for the task of opening the cover portion. Thus, a single hinge tool may be used for opening on different occasions cover portions of separate nacelles, e.g. of wind turbines in a wind farm. Therefore, there will be no need to equip each individual wind turbine with a hinge for the cover portion, and this will decrease the complexity and cost of the wind turbines. The hinge tool may be arranged to be mounted on the outside or the inside of the cover and the cover portion. For example, when the need arises to open the cover portion, the hinge tool may be brought to the wind turbine, and up the tower to an interior or an exterior of the nacelle. More generally, the hinge tool may be stored, in the wind turbine or remotely, during operation of the wind turbine. Here, operation of the wind turbine means running the wind turbine to produce electricity by means of the rotor and the generator. The hinge tool may then be removably attached to the cover and the cover portion, while the cover portion covers the opening.

Preferably, attaching the hinge tool comprises connecting the hinge tool to the cover portion by means of at least one first fastening element, and connecting the hinge tool to the cover by means of at least one second fastening element, whereby the swing joint is provided between the first and second fastening elements. Preferably, the attachment of the hinge tool is performed so that the swing joint provides a substantially horizontal hinge line. Thereby, the method may be applied to large nacelle roof cover portions which may be substantially horizontal in their closed position.

Attaching at least one hinge tool may comprise attaching at least two hinge tools to the cover portion and to the cover, each presenting a swing joint, so that the swing joints present a common hinge line. Thereby, additional stability is provided to the cover portion during the opening process, by distributing the hinge tool at a suitable distance along the hinge line.

Preferably, where the nacelle comprises a service crane, the method comprises opening by means of the service crane the cover portion in a pivoting motion around the swing joint. Thereby, as described below, no devices, such as motors or hydraulic cylinders, solely dedicated to provide power for opening and closing of the cover portion are needed. This means that the complexity and cost of the wind turbine may be reduced.

As exemplified below, the hinge tool may present a first hinge portion and a second hinge portion, the swing joint connecting the first and second hinge portions. Thereby, attaching the hinge tool to the cover portion may comprise connecting the first hinge portion of the hinge tool to the cover portion, the method further comprising connecting the service crane to the first hinge portion. Thereby, the first hinge portion may advantageously provide a hard point for the crane connection. Alternatively, the service crane may be connected directly to the cover portion.

Preferably, the method comprises attaching at least one abutment device so as to be fixed in relation to the cover, and opening the cover portion in a pivoting motion around the swing joint until the cover portion abuts the abutment device. The abutment device may be attached during the operation of attaching the hinge tool. The abutment device may even be a part of the hinge tool. By including the attachment of the abutment device in the method of opening the cover portion, a permanent installation of an abutment device may be avoided, reducing the complexity of the wind turbine.

The swing joint may form a hinge line, and the centre of gravity of the cover portion may be located, when the cover portion is in the closed position, on a first side of a vertical plane being parallel with and intersecting the hinge line, and the abutment device is positioned in relation to the swing joint so that when the cover portion abuts the abutment device, the centre of gravity of the cover portion is located on the first side of said vertical plane. Thereby, where the cover portion is pivoted upwards from a substantially horizontal position, the pivoting motion is stopped before said centre of gravity has passed said vertical plane, and the risk of an uncontrolled pivoting motion of the cover portion at the end of the cover portion opening step is eliminated.

Preferably, where a cooler is mounted to the nacelle on an exterior of the nacelle, the method comprises opening the cover portion in a pivoting motion around the swing joint, and securing the opened cover portion to the cooler. As explained below, by using the cooler to secure the opened cover portion, no dedicated device for securing the cover portion, such as a fastening bracket, is needed. Thus, an increase of the wind turbine complexity is thereby avoided.

As suggested, the method of opening the cover portion is advantageously used as a service method. Thus, the wind turbine may be operated before the attachment of the hinge tool. After the attachment of the hinge tool, the cover portion may be opened in a pivoting motion around the swing joint, and subsequently the cover portion may be closed in a pivoting motion around the swing joint. The hinge tool may be removed after the closing of the cover portion. The wind turbine may be operated after the removal of the hinge tool.

The objects are also reached with a method for opening a cover portion of a wind turbine comprising a nacelle mounted on top of a tower, the nacelle supporting a rotor and a generator connected to the rotor, the nacelle comprising a cover presenting an access opening, the cover portion being adapted to removably cover the access opening, the nacelle also comprising a service crane, the method comprising opening by means of the service crane the cover portion. Thus, an on-board service crane may be used for opening the cover portion. The service crane may provide power for moving the cover portion. Thereby, manual opening of a large cover portion may be avoided. In addition, no devices, such as motors or hydraulic cylinders, solely dedicated to provide power for the opening and closing of the cover portion are needed. This means that the complexity and cost of the wind turbine may be reduced. The service crane may be used for other tasks besides opening the cover portion.

Preferably, opening the cover portion comprises opening the cover portion in a pivoting motion. Thereby, the opening step may be easily performed by a crane of a type commonly used for service cranes in wind turbine nacelles, such as a boom crane. For example, the pivoting motion may be effected by extending or shortening a telescoping boom of the service crane, as exemplified below. It should be noted however, that the cover portion may alternatively be opened by some other motion, e.g. a purely translational motion.

Preferably, the cover portion is allowed to undergo the pivoting motion until the cover portion abuts an abutment device which is fixed in relation to the cover. As suggested above, where the cover portion is pivoted upwards from a substantially horizontal position, the abutment device provides for stopping the pivoting motion before the cover portion centre of gravity has passed above a pivoting motion hinge line, and the risk of an uncontrolled pivoting motion in which the cover portion falls at the end of the cover portion opening step is thereby eliminated.

Where the service crane is a boom crane comprising a boom extending from a crane base, the method may comprise connecting the cover portion to the boom, and opening the cover portion may comprise re-positioning the boom so as to open the cover portion, by means of the connection to the boom, in a pivoting motion around a hinge line. As also suggested above, a beneficial use of the boom crane, a commonly provided service crane type in wind turbine nacelles, is thereby provided. The cover portion may be connected to the boom in any suitable manner, e.g. by a load connecting device of the service crane, such as a crane hook, or by straps. The boom may be connected to the crane base so as to be cantilevered. As exemplified below, the boom may be pivotable in two directions, e.g. around a vertical axis and around a horizontal axis. Thus the re-positioning of the boom so as to open the cover portion may involve a boom pivoting motion. As exemplified below the re-positioning of the boom may also, or alternatively, involve extending or shortening the boom, and/or operating a winch mounted to the boom and connected to the cover portion.

Where the service crane is a boom crane comprising a boom extending from a crane base, and opening the cover portion comprises opening the cover portion in a pivoting motion around a hinge line, the hinge line and the crane base may be located on opposite sides of the cover portion. Thereby, the crane base is located, in the closed position of the cover portion, closer to a distal edge of the cover portion than to the hinge line. This reduces the requirements on the extension of the boom, since the boom may be attached at said distal edge for opening the cover portion. It should be noted that, as exemplified below, the boom may be attached, by means of one or more elongated, flexible devices such as straps, belts, ropes or chains, to the cover portion via the hinge tool, or directly to the cover portion. I.e. the elongated, flexible devices may be attached to the cover portion via the hinge tool or directly to the cover portion.

Where the boom is a telescoping boom, opening the cover portion may comprise extending the boom. Thus, the re-positioning the boom so as to open the cover portion may involve extending the boom. This provides a simple and controllable manner of opening the cover portion. More generally, opening the cover portion may comprise re-positioning the crane, e.g. by re-positioning the boom, so as to open the cover portion. In some embodiments, a winch may be mounted to the boom, e.g. to a distal end thereof. Thus, the re-positioning the crane so as to open the cover portion may involve operating the winch.

In preferred embodiments, where the service crane is a boom crane mounted inside the nacelle, the method comprises opening at least one hatch to expose an additional opening in the cover, wherein the step of opening the cover portion comprises opening by means of the service crane the cover portion while the service crane, preferably a boom thereof, protrudes through the additional opening. The additional opening may be used for a variety of operations, e.g. service operations involving moving components into or out of the nacelle. The access opening may thereby provide an additional access capacity for service operations. For example, the additional opening may be provided in one part of a roof of the nacelle, and the access opening may be provided in another part of the nacelle roof. The hatch may be opened manually, or one or more suitable devices, such as motors or hydraulic cylinders, for powering the hatch opening may be provided. The embodiments provide for using the additional opening to open the cover portion by allowing the service crane to protrude through the additional opening.

Preferably, where a cooler is mounted to the nacelle on an exterior of the nacelle, the method comprises securing the opened cover portion to the cooler. As explained below, by using the cooler to secure the opened cover portion, no dedicated device for securing the cover portion, such as a fastening bracket, is needed. Thus, an increase of the wind turbine complexity is thereby avoided.

The service crane may be permanently installed in the nacelle. As suggested the service crane may be arranged to assist in various service procedures for the wind turbine. Thus, a wind turbine component other than the cover portion may be moved by means of the service crane.

The objects are also reached with a method for opening a cover portion of a wind turbine comprising a nacelle mounted on top of a tower, the nacelle supporting a rotor and a generator connected to the rotor, the nacelle comprising a cover presenting an access opening, the cover portion being adapted to removably cover the access opening, a cooler being mounted to the nacelle on an exterior of the nacelle, the method comprising opening the cover portion, e.g. in a pivoting motion, and securing the opened cover portion to the cooler. Many wind turbine models have one or more cooler mounted on the nacelle exterior. The cooler may form a part of a cooling system for components in the nacelle, such as the generator or a gearbox. By using the cooler to secure the opened cover portion, no dedicated device for securing the cover portion, such as a fastening bracket, is needed. Thus, an increase of the wind turbine complexity is thereby avoided. The cover portion may be secured to the cooler in any suitable manner, e.g. by straps, belts or ropes.

For safety while the cover portion is open, an auxiliary fence may be temporarily mounted at least partly around the access opening. This is particularly beneficial where the access opening is provided in a roof of the nacelle, to reduce the risk of a person falling into the nacelle through the access opening. Preferably, the auxiliary fence is mounted before the cover portion is opened.

Where the step of opening the cover portion comprises opening the cover portion in a pivoting motion, the method may comprise allowing the cover portion to undergo the pivoting motion until the cover portion abuts an abutment device which is fixed in relation to the cover. The abutment device and the cooler may be provided on the same side of the cover portion. Thereby, the cover portion may be safely secured by being biased against the abutment device by means of the connection to the cooler.

In some embodiments, a winch with an elongated, flexible pulling device is attached to the cooler, said opening of the cover portion and/or said securing of the opened cover portion to the cooler being done by means of the winch. The pulling device may be e.g. a chain, a rope or a belt. The winch and the pulling device form a chain hoist. Thereby, the cooler may advantageously be used as a support for opening or closing the cover portion. This provides an alternative manner of opening or closing the cover portion, e.g. when a nacelle crane is not available.

The cover portion may be a roof panel of the nacelle. Embodiments of the invention allows for a large cover portion exposing when opened a large access opening in the nacelle roof, whereby the access of large components in the nacelle is facilitated. At least a part of the cover portion may form at least a part of a helihoist platform of the nacelle.

The objects are also reached with a hinge tool for a cover portion of a wind turbine nacelle, wherein the hinge tool presents a first hinge portion, a second hinge portion, a swing joint connecting the first and second hinge portions, and a cover portion abutment device fixed to the second hinge portion. Such a hinge tool may advantageously be used in embodiments of the methods of the invention. The abutment device may be integrated into the hinge tool and thereby the hinge tool may provide a combination of a cover portion pivoting capacity and an arrest for the cover portion pivoting motion as described above. I.e. the hinge tool may provide for the cover portion to undergo the pivoting motion until the cover portion abuts the abutment device which is fixed in relation to the cover of the nacelle. The first hinge portion may be arranged to be fixed to the cover portion, and the second hinge portion may be arranged to be fixed to the cover.

Preferably, the first hinge portion is arranged to undergo a pivoting motion around the swing joint until the first hinge portion abuts the abutment device. Thereby, the cover portion may abut the abutment device via the first hinge portion so that a direct contact between the cover portion and the abutment device is avoided.

The first hinge portion may present an attachment device for securing the first hinge portion when abutting the abutment device. Thereby the hinge tool may provide the additional function of allowing the cover portion to be secured, e.g. to a cooler as described above, while being open.

The objects are also reached with a nacelle for a wind turbine, the nacelle comprising a cover presenting an access opening, and a cover portion being adapted to removably cover the access opening and to be opened in a pivoting motion around a hinge line, the nacelle also comprising a service crane in the form of a boom crane comprising a boom extending from a crane base, wherein the hinge line and the crane base are located on opposite sides of the access opening, the crane being arranged to be re-positioned while the boom is connected to the cover portion so as to pivot the cover portion around the hinge line. The crane may be arranged to be re-positioned for example by the boom being arranged to be re-positioned, e.g. by boom pivoting and/or telescoping, and/or by a winch being mounted to the boom, as exemplified elsewhere herein, being arranged to be operated e.g. while connected to the cover portion. Similarly to embodiments of the method described above, since the hinge line and the crane base are located on opposite sides of the cover portion, the crane base is located, in the closed position of the cover portion, closer to a distal edge of the cover portion than to the hinge line. This reduces the requirements on the extension of the boom, since the boom may be attached at said distal edge for opening the cover portion. As suggested, said boom attachment may be made to the hinge tool fixed to the cover portion, or directly to the cover portion.

Where the boom is a telescoping boom, the boom may be arranged to be extended while the boom is connected to the cover portion so as to pivot the cover portion around the hinge line. As also suggested above, this provides a simple and controllable manner of opening the cover portion.

Where the crane base is mounted inside the nacelle, and the nacelle comprises at least one hatch arranged to cover an additional opening in the cover, the additional opening and the hinge line may be located on opposite sides of the access opening, and the boom may be arranged to protrude through the additional opening while the hatch is open for said pivoting of the cover portion. As also suggested above, this provides for using the additional opening to open the cover portion by allowing the service crane to protrude through the additional opening.

DESCRIPTION OF THE DRAWINGS

Below embodiments of the invention will be described with reference to the drawings, in which.

DETAILED DESCRIPTION

Figure 1:
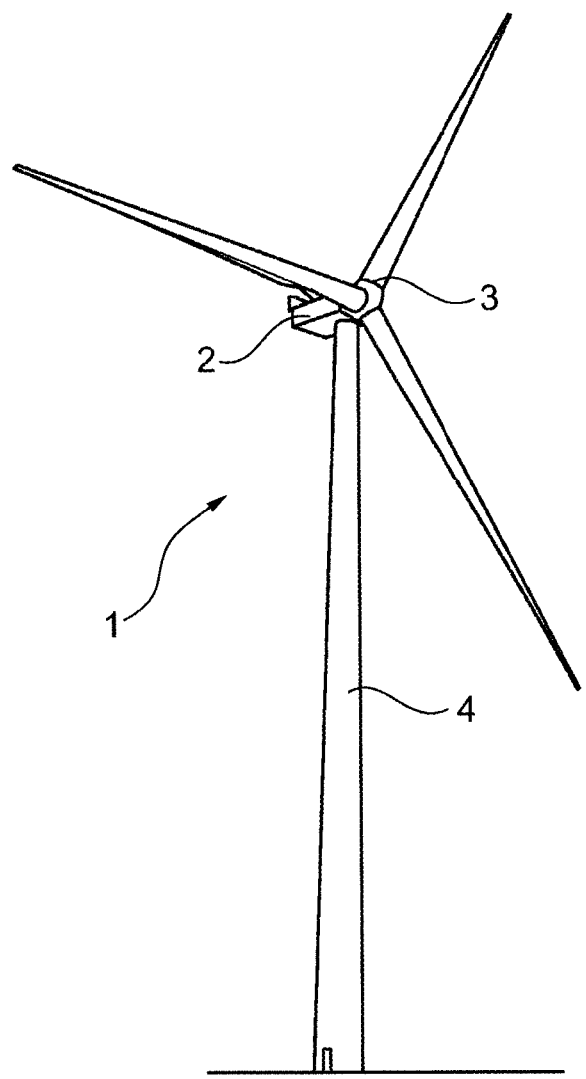
FIG. 1 is a perspective view of a wind turbine.

FIG. 1 shows a wind turbine 1 comprising a nacelle 2 mounted on top of a tower 4 and supporting a rotor 3. The rotor 3 comprises in this example three blades mounted to a hub, but in alternative examples, the rotor may comprise one, two, or more than three blades.

Figure 2:
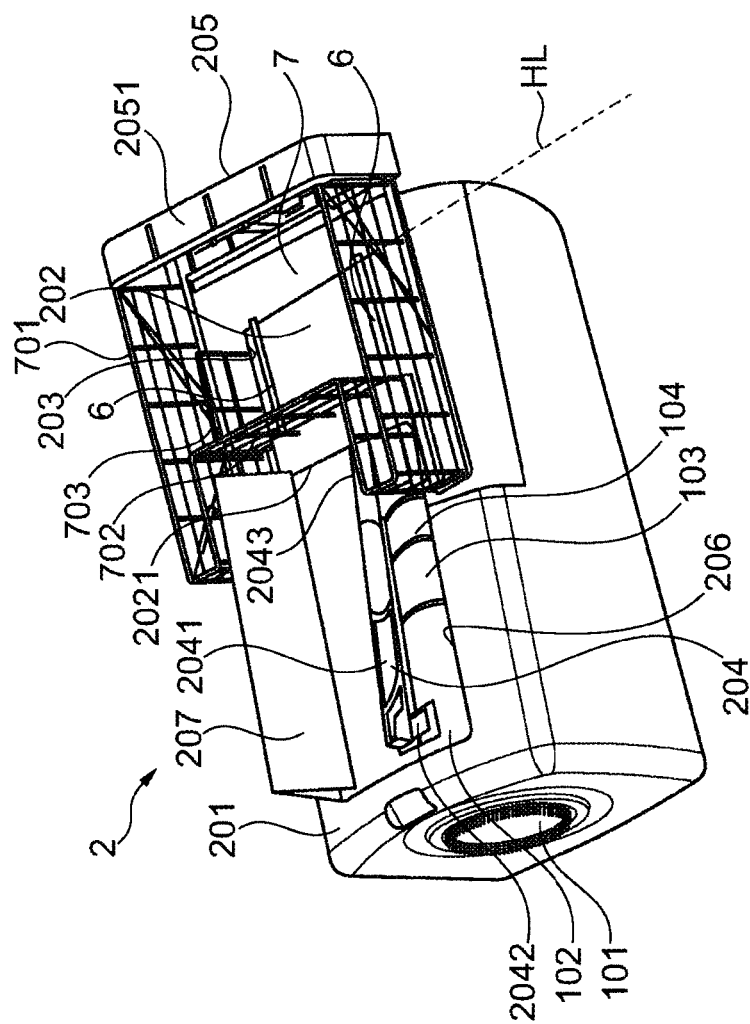
FIG. 2 is a perspective view of a nacelle of the wind turbine in FIG. 1.

As can be seen in FIG. 2, the nacelle 2 comprises a cover 201, which may be provided in any suitable manner: For example, the cover 201 may comprise a plurality of panels, formed e.g. of fiberglass or metal sheet, joined, e.g. by riveting, and supported by a skeleton structure, comprising e.g. metal beams. The nacelle 2 houses a main shaft 101 connected to the rotor 3 (FIG. 1). Thereby, the rotor is mounted to the nacelle 2 at one of two longitudinal ends of the nacelle 2. The longitudinal direction of the nacelle is herein understood as a direction which is parallel with a rotational axis of the rotor 3. It should be noted that the rotor axis presents a relatively small angle to the horizontal plane, e.g. 5°-10°. The nacelle also houses a main shaft housing 102 supporting the main shaft 101, and a gear box 103 connected to the main shaft 101. The nacelle further houses a generator 104 connected to the gearbox, i.e. connected to the rotor 3 via the main shaft 101 and the gearbox 103.

A cooler 205 is mounted to the nacelle 2, on an exterior of the nacelle 2. The cooler 205 is mounted at an end of the nacelle 2 which is opposite to the end at which the rotor 3 is mounted. The cooler 205 extends along a transverse upper edge of the nacelle 2, and protrudes upwardly from the nacelle. The cooler 205 comprises a number of heat exchanging panels located within a frame 2051.

The cover 201 presents a first opening 206 and a second opening 203. The first opening 206 is herein also referred to as an additional opening 206, and the second opening 203 is herein also referred to as an access opening 203.

The first opening is provided in a part of the cover 201 forming a roof of the nacelle 2. The first opening 206 has a substantially rectangular planform as seen from above. A foldable hatch 207 is arranged to cover the first opening 206, and in FIG. 2 the hatch is shown as folded so as to expose the first opening 206. Thus, the hatch is formed by two panels which are joined by a hinge connection, one of the panels being hinged along a side of the first opening 206. It should be noted that the hatch 207 may be provided in any suitable alternative form, e.g. as one or more panels arranged to be opened by a translational motion without rotation.

The first opening 206 allows access from outside of components in the nacelle, such as the generator 104 and the gearbox 103. The first opening 206 allows for components and tools to the moved into and out of the nacelle, e.g. by mean of an external crane or a nacelle service crane as described below.

The second opening 203 is also provided in a part of the cover 201 forming a roof of the nacelle 2. The second opening 203 is located between the first opening 206 and the cooler 205. Thus the second opening 203 is located further from the rotor than the first opening 206. The second opening 203 is adjacent to the first opening 206.

A cover portion 202 is adapted to removably cover the second opening 203. The cover portion 202 when closed is adjacent to the hatch 207 when closed. Thus, when the cover portion 202 as well as the hatch are open as described closer below, the first and second openings 203, 206 form a combined opening. This combined opening extends in this example across a major portion of the nacelle roof. Thereby, access of components for the nacelle is increased.

It should be noted that the invention is applicable to any alternative mutual arrangement of the first and second openings 206, 203. For example, the openings 206, 203 may be located at a distance from each other, and/or the second opening 203 may be located closer to the rotor 3 than the first opening 206. Also, one or both openings may be formed in a part of the cover 201 other than the nacelle roof, e.g. in a vertical side of the cover 201, or on a lower side of the cover 201.

It is understood that the cover portion 202 forms a roof panel of the nacelle 2. Further, a major part of the cover portion 202, towards the cooler 205, forms a part of a helihoist platform 7 of the nacelle 2. The helihoist platform 7 is delimited by a fence 701. The helihoist platform 7 is located between the first opening 206 and the cooler 205.

The embodiment described here involves a method for opening the cover portion 202. Such an opening may form a part of a service operation of the wind turbine 1. The service operation may involve moving a wind turbine component into or out of the nacelle through the second opening 203. The service operation may be performed at any time during the lifetime of the wind turbine. Thus, the opening of the cover portion 202 may follow upon operation of the wind turbine 1.

The nacelle 2 also comprises a service crane 204. The service crane 204 is in this embodiment a boom crane comprising a boom 2041 extending from a crane base 2042. The crane base 2042 is mounted inside the nacelle 2. More specifically, the crane base is mounted onto a support formed by the main shaft housing 102. It should be noted that in alternative embodiments, service crane 204 may be mounted onto some other suitable support, such as a part of a nacelle structure, laterally besides the main shaft housing, besides the gearbox 103 or besides the generator 104. In further embodiments the service crane 204 may be mounted onto a support formed by the gearbox 103, the generator 104, or even the nacelle roof such that the service crane 204 is provided outside of the nacelle interior.

The boom 2041 is pivotable in two directions. More specifically, the crane base 2042 is by means of a suitable interface rotatable in relation to the main shaft housing 102 around a substantially vertical axis, and the boom 2041 is at a joint, connecting the boom to the crane base 2042, rotatable around a substantially horizontal axis. The boom 2041 is in this embodiment a telescoping boom, i.e. it may be extended or shortened. In addition, a winch, described below, to which a load may be connected, is mounted on the distal end of the boom. Suitable actuators, such as hydraulic cylinders or electric actuators, are provided to effectuate movements of the crane base 2042 around the vertical axis, movements of the boom 2041 around the horizontal axis, and telescoping movements of the boom 2041.

The embodiment described here involves using the service crane for opening the cover portion 202 as described below. It should be noted that the service crane 204 is arranged to also move something other than the cover portion 202, e.g. a wind turbine component such as a filter for an oil system for the gearbox 103. Items may be moved by means of the service crane from one place to another inside the nacelle. Items may also be moved from the nacelle exterior to the nacelle interior, or vice versa, via the first opening 206 while the hatch 207 is open. For example, the service crane in this embodiment may move a component from the helihoist platform 7 into the nacelle 2, or vice versa, via the first opening 206.

Figure 3:
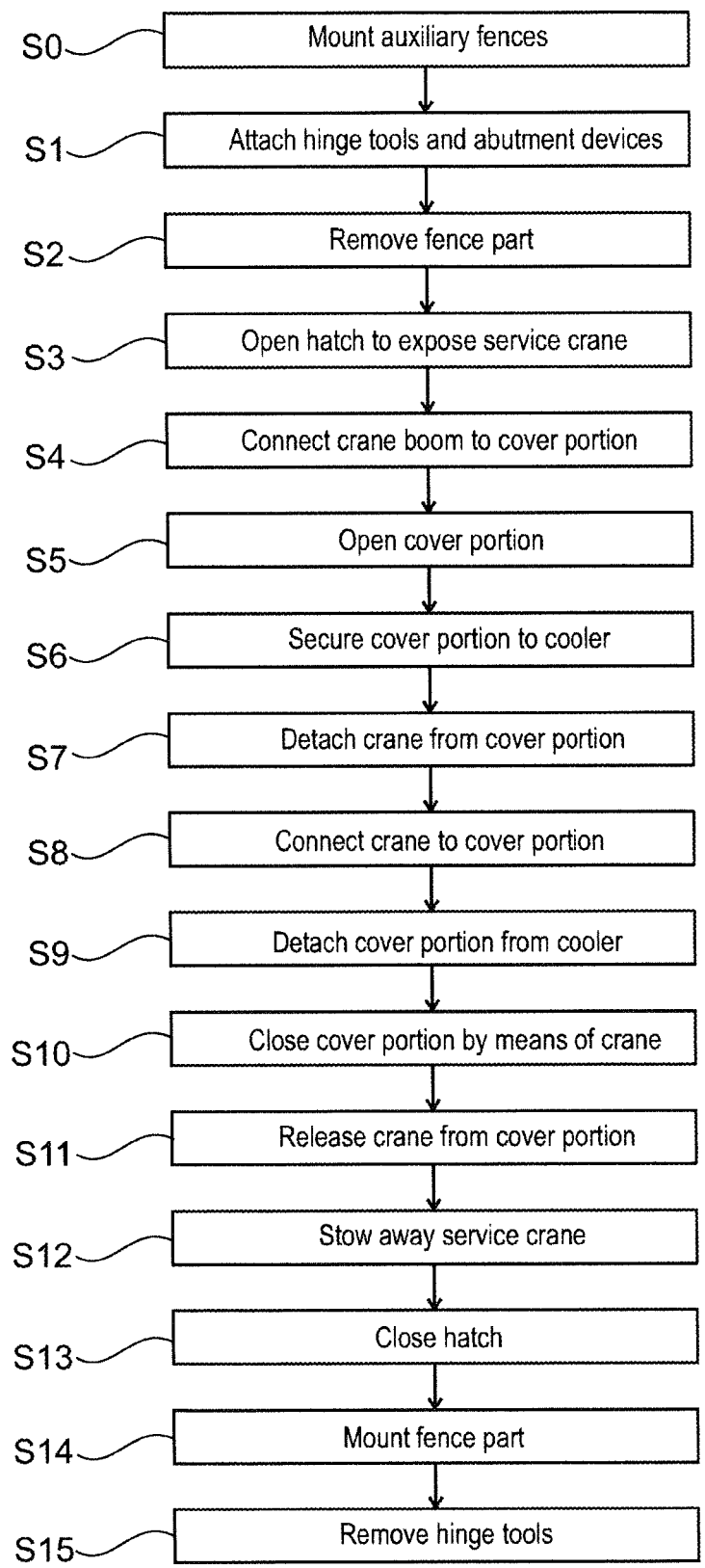
FIG. 3 is a block diagram depicting steps in a method for opening a cover portion of the nacelle in FIG. 2.

As suggested in FIG. 3, for opening the cover portion, two auxiliary fences 703 are mounted S0 on opposite lateral sides of the cover portion 202.

Also for opening the cover portion 202, two hinge tools 6 are attached S1 to the cover portion 202 and to the cover 201 as illustrated in FIG. 2. The number of hinge tools 6 may vary; e.g. only one or more than two hinge tools 6 may be used for opening the cover portion 202. The hinge tools may be stored in the wind turbine, or they may be brought from a remote location for a service process involving the cover portion opening. The hinge tools 6 are temporarily for the opening of the cover portion 202 mounted externally, in this embodiment inside the fence 701, on the helihoist platform 7.

Figure 4:
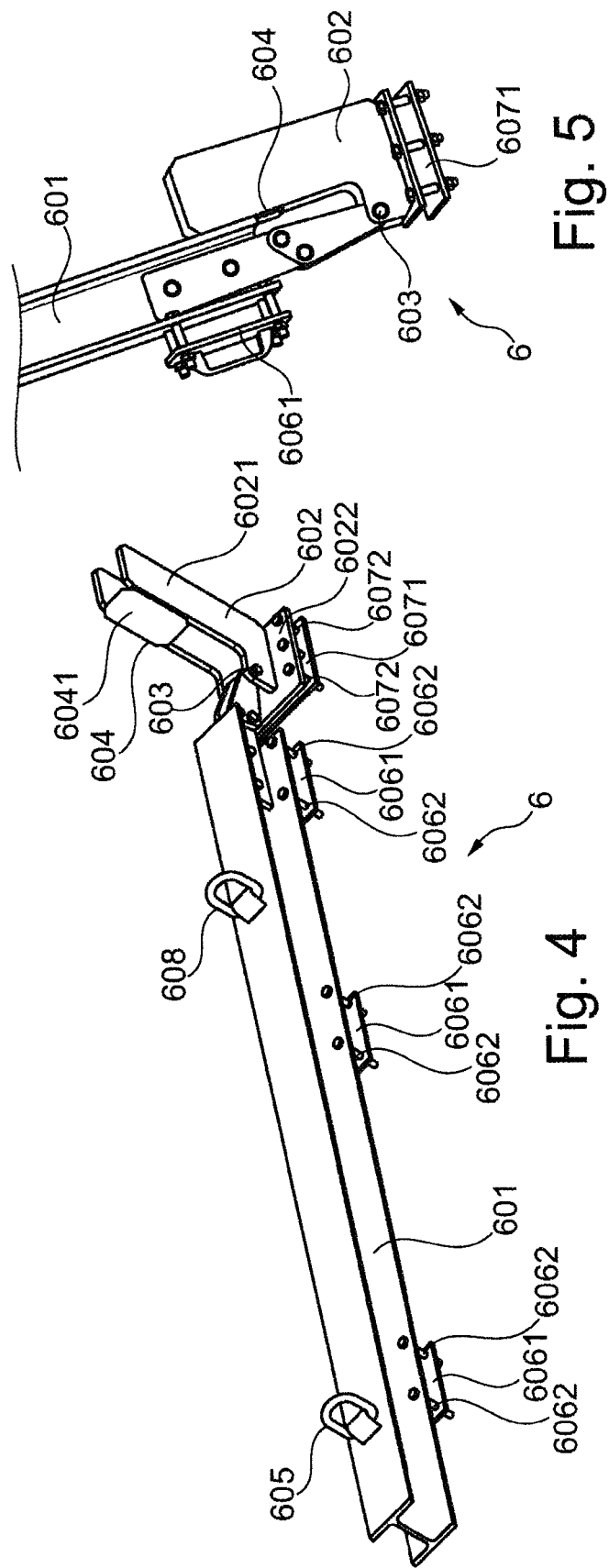
FIG. 4 is a perspective view of a hinge tool used in the method depicted in FIG. 3.
Figure 5:
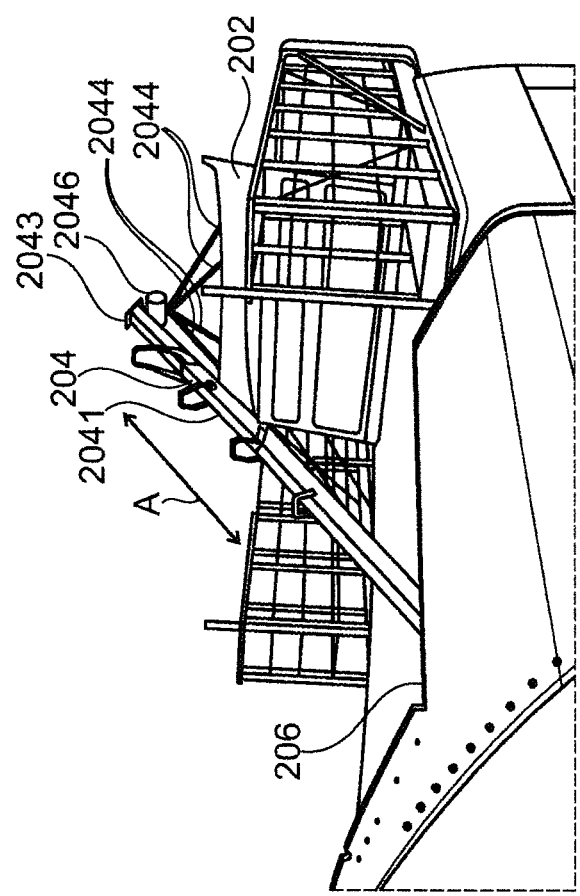
FIG. 5 is a perspective view of a portion of the hinge tool in FIG. 4 in a folded position.

Reference is made to FIG. 4 and FIG. 5. The hinge tool 6 presents a first hinge portion 601, a second hinge portion 602, and a swing joint 603 connecting the first and second hinge portions. The hinge portions 601, 602 are made of a suitable material, such as steel or aluminium. The swing joint 603 allows a rotational movement of one of the hinge portions 601, 602 in relation to the other. The first hinge portion 601 comprises an elongated beam, more specifically an I-beam, the swing joint 603 being located at one end of the beam. It should be noted that the first hinge portion 601 may comprise, instead of an I-beam, an alternative structure, such as an elongated plate, a tube, etc.

The second hinge portion 602 comprises two L-shaped brackets 6021 fixed to a base plate 6022. A cover portion abutment device 604 is fixed to the second hinge portion 602. The abutment device 604 presents a flat abutment surface 6041. The first hinge portion 601 is arranged to undergo a pivoting motion around the swing joint 603 until the first hinge portion 601 abuts the flat surface 6041 of the abutment device 604. The first hinge portion 601 presents a first attachment device 605, in the form of a metal loop, for securing the first hinge portion 601 when abutting the abutment device 604. The first hinge portion 601 also presents a second attachment device 608, in the form of a metal loop. The second attachment device 608 is located closer to the swing joint than the first attachment device 605. The attachment devices 605, 608 are used to connect the service crane 204 to the cover portion via the first hinge portion 601, as described closer below.

Attaching the hinge tools 6 comprises connecting the respective first hinge portion 601 to the cover portion 202 by means of first fastening elements 6061, 6062, and connecting respective the second hinge portion 602 to the cover 201 by means of second fastening elements 6071, 6072. Thereby, in each hinge tool, the swing joint 603 is provided between the first and second fastening elements 6061, 6062, 6071, 6072. The first fastening elements comprise three first anchoring brackets 6061 distributed along first hinge portion 601, and first bolt and nut combinations 6062 to secure the first anchoring brackets 6061 to the first hinge portion 601. The second fastening elements comprise a second anchoring bracket 6071, and second bolt and nut combinations 6072 to secure the second anchoring bracket 6071 to the second hinge portion 602. The cover 201 and the cover portion 202 are provided with holes for the bolts of the bolt and nut combinations 6062, 6072.

Each first hinge portion 601 is positioned on an outer side of the cover 201 and the cover portion 202. The first anchoring brackets 6061 are positioned on an inner side of the cover portion 202, and secured to the first hinge portion 601 by each bolt of the first bolt and nut combinations 6062 extending through a respective of said holes through the cover portion 202. The second anchoring bracket 6071 is positioned on an inner side of the cover 201, and secured to the second hinge portion 602 by each bolt of the second bolt and nut combinations 6072 extending through a respective of said holes through the cover 201. It is understood that, as the hinge tools 6 are attached, the abutment devices 604 are attached S1 as well, so as to be fixed in relation to the cover 201.

As understood from FIG. 2 and FIG. 4, the attachment of the hinge tools 6 is performed so that the swing joints 603 provides a common, substantially horizontal hinge line HL for the cover portion 202. The hinge line HL is oriented substantially perpendicularly to the longitudinal direction of the nacelle 2. It is understood that the hinge line HL and the crane base 2042 are located on opposite sides of the access opening 203.

Also, for opening the cover portion 202, a part 702 of the fence 701 around the helihoist platform 7 is removed S2. Said fence part is mounted to the cover portion 202. In alternative embodiments, a helihoist fence part may be left attached to the cover portion 202 while the latter is opened.

In addition, for opening the cover portion 202, the hatch 207 is opened S3 to expose the first opening 206 in the cover 201. This will also expose the service crane 204. Thereafter, the boom 2041 of the service crane is pivoted upwards and extended so that a distal end 2043 of the boom is located above the cover portion 202, so that a distance between the cooler 205 and the boom distal end 2043 is shorter than a distance between the cooler 205 and an edge 2021 of the cover portion 202, which edge 2021, herein also referred to as a distal edge, is located on the opposite side of the cover portion 202 in relation to the hinge line HL. Thereafter the boom distal end 2043 is connected S4 via the hinge tool to the cover portion 202 with straps as described below. It should be noted that in alternative embodiments, the boom may be connected to the cover portion 202 without any preceding movement of the boom distal end 2043 to be located above the cover portion 202.

Figure 6:
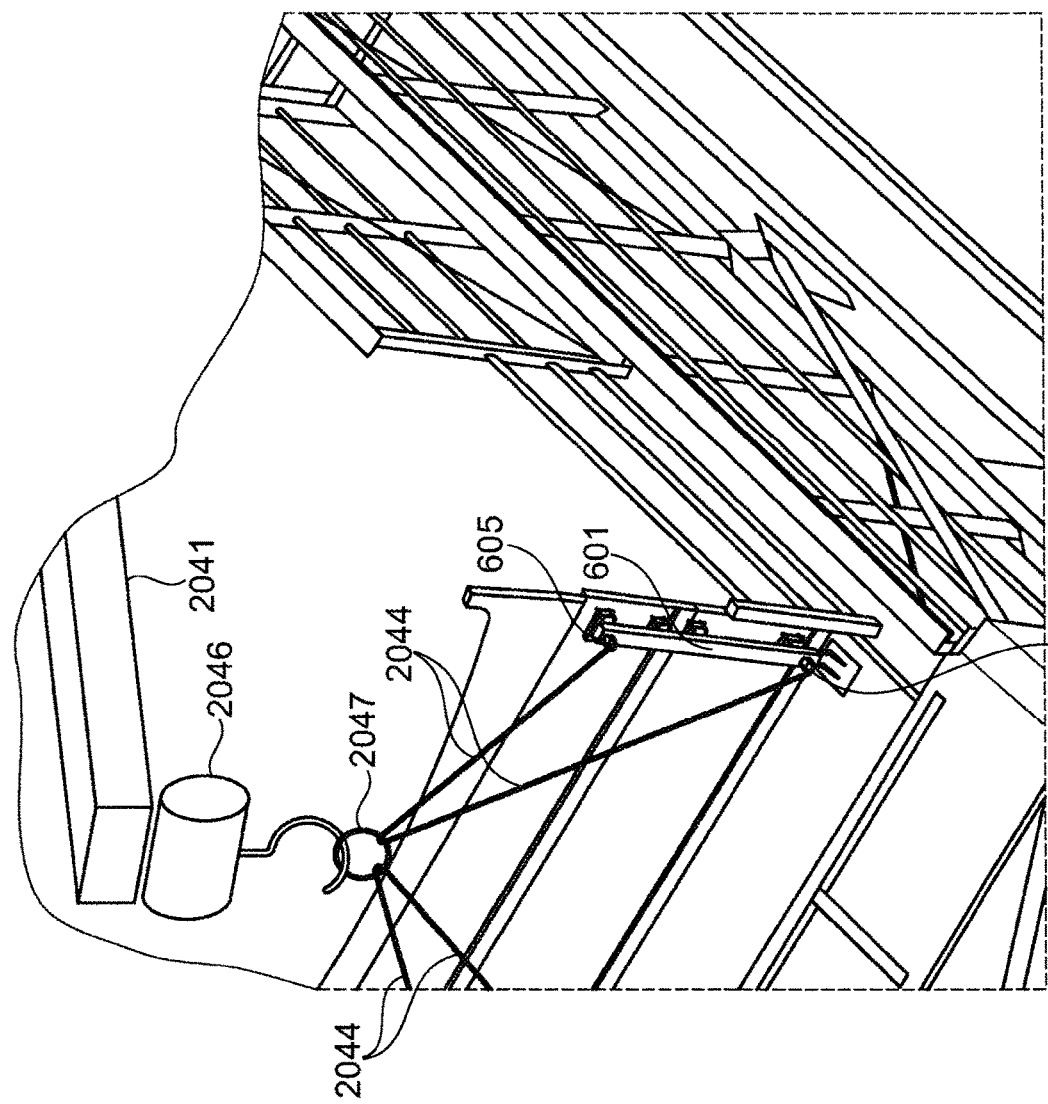
FIG. 6a and FIG. 6b are perspective views of a portion of the nacelle in FIG. 2 when the cover portion is open.

Reference is made to FIG. 6a and FIG. 6b showing the straps 2044 connecting the boom 2041 to the cover portion 202 via the winch 2046 and the first hinge portion 601. As can be seen in FIG. 6b, the straps 2044 are connected to the attachment devices 605, 608. Thereby, two straps 2044 are provided, each of which extends from one of the first attachment devices 605 to one of the second attachment devices 608 via a metal loop 2047 connected to the winch 2046. Thereby the straps 2044 may slide through the metal loop 2047 so as to allow the distances between the first attachment devices 605 and the metal loop 2047 and the distances between the second attachment devices 608 and the metal loop 2047 to change.

It should be noted that in alternative embodiment, the straps 2044 may be connected directly to the cover portion 202, e.g. at connection brackets presented by the cover portion 202.

Once the service crane 204 has been connected to the cover portion 202 via the first hinge portion 601, the cover portion 202 is opened S5 by means of the service crane 204 in a pivoting motion around the swing joints 603, i.e. around the hinge line HL, while the service crane 204 protrudes through the first opening 206. This opening comprises re-positioning the distal end 2043 of the boom 2041 by extending the boom, as indicated by the double arrow A. Alternatively, or in addition the opening may comprise actuation of the winch 2046 so as to pull the cover portion 202 towards the crane boom 2041. The boom 2041 is extended and/or the winch 2046 is actuated so as for the pivoting motion of the cover portion 202 around the swing joint 603 to continue until the cover portion 202 abuts the abutment devices 604 via the first hinge portions 601, (FIG. 5).

It should be noted that the centre of gravity of the cover portion 202 is located, when the cover portion is in the closed position, on a first side of a vertical plane being parallel with and intersecting the hinge line HL, and the abutment devices 604 are positioned in relation to the swing joints 603 so that when the cover portion 202 abuts the abutment devices 604, the centre of gravity of the cover portion 202 is still located on the first side of said vertical plane. Thus the abutment surfaces 6041 of the abutment devices 604 are located in relation to the swing joints 603 so that when the cover portion 202 abuts the abutment devices 604, the centre of gravity of the cover portion 202 is located on the same side of a vertical plane, being parallel with and including the hinge line HL, as a vertical axis intersecting the crane base 2042. This may be accomplished e.g. by the abutment surfaces 6041 being positioned such that the first hinge portions 601, when abutting the abutment surfaces 6041, lean towards the crane base 2042 and extend in an angle to a horizontal plane which is less than 90°, for example 85-89°, e.g. 88°. Thereby, the risk of the cover portion 202 "tipping over", or an uncontrolled pivoting motion of the cover portion 202 at the end of the cover portion opening step, is eliminated.

Figure 7:
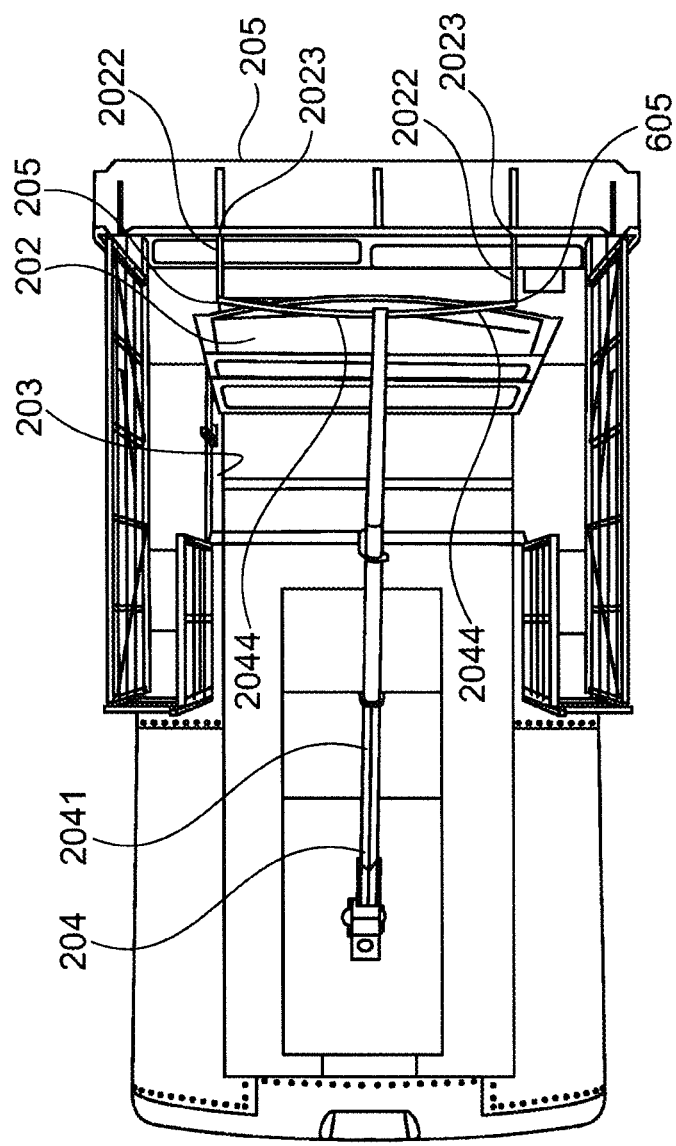
FIG. 7 is a top view of the nacelle in FIG. 2 with the cover portion opened.

Reference is made to FIG. 7. While the opened cover portion 202 is biased against the abutment devices 604 by means of the service crane 204, the cover portion 202 is secured S6 to the cooler 205. For this ties 2022 are stretched between the attachment devices 605 on the hinge tools (FIG. 4) and securing devices 2023 on the cooler 205. It is understood that the cover portion 202 may be attached to the cooler in a variety of alternative manners, e.g. by means of pull action latches, or pins extending through holes in ears attached to the cover portion 202 and to the cooler 205. It should be noted that FIG. 7 shows, for easy of visibility, the cover portion 202 opened so as to lean towards the cooler 205. However, as discussed above, preferably the centre of gravity of the opened cover portion 202 is located on the same side of a vertical plane, being parallel with and including the hinge line HL, as a vertical axis intersecting the crane base 2042, (FIG. 2).

Once the cover portion 202 is secured to the cooler 205, the crane boom 2041 can be detached S7 from the cover portion 202, i.e. detached from the first hinge portions 601 (FIG. 6b), and moved away from the cover portion 202. Thereby, the second opening 203 is exposed and items may be moved through the second opening 203, into or out of the nacelle 2, e.g. by means of the service crane 204 or by some other lifting aid, e.g. an external crane supported next to the wind turbine.

For subsequently closing the cover portion 202, basically the steps above are reversed. Thus, the crane boom 2041 is attached S8 to the cover portion 202 via the first hinge portions 601 (FIG. 6b), and the cover portion 202 is then released S9 from the cooler 205. Thereafter, the cover portion 202 is closed S10 in a pivoting motion around the swing joints 603 by shortening the crane boom 2041, and then the crane boom 2041 is released S11 from the cover portion 202 by being released from the first hinge portions 601. Subsequently the service crane 204 may be stowed S12 in the nacelle 2 and the hatch 207 may be closed S13. Also, the removed part 702 of the fence 701 is mounted S14 onto the cover portion 202. In addition, the hinge tools 6 are removed S15.

Figure 8:
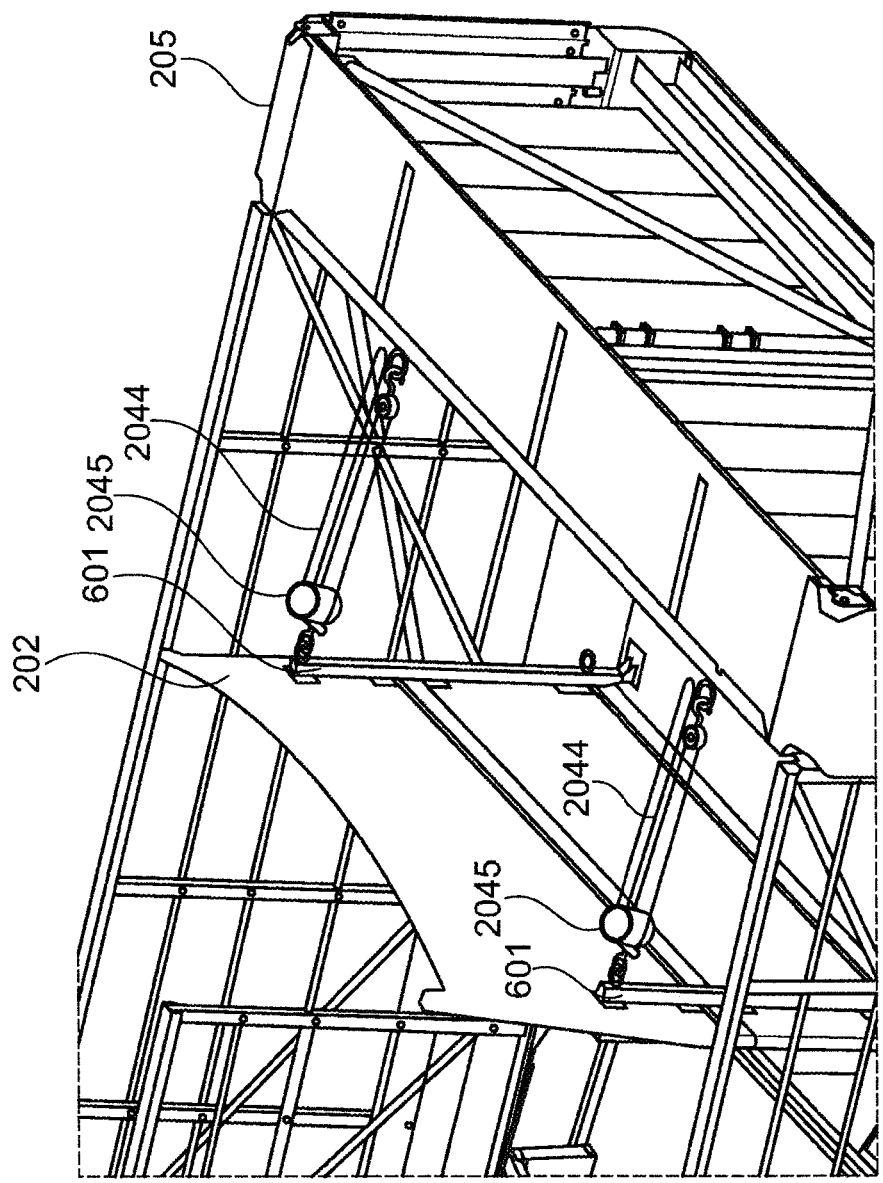
FIG. 8 is a perspective view of a portion of the nacelle in FIG. 2 showing a detail according to an alternative embodiment of the invention.

Reference is made to FIG. 8, showing an alternative manner of securing the cover portion 202 to the cooler 205. A chain hoist with a winch 2045 and an elongated, flexible pulling device in the form of a chain 2044 is attached to the cooler 205 and to a respective of the first hinge portions 601. Thus, each the chain hoist 2044, 2045 is attached to the cover portion 202 via the respective first hinge portion 601. Thereby, the cooler 205 may be used as a support for opening or closing the cover portion 202. This provides an alternative manner of opening or closing the cover portion, e.g. when the nacelle crane 204 is not available. It should be noticed while in this embodiment, a winch 2045 and a pulling device 2044 is attached to each of the first hinge portions 601, in alternative embodiments, a single winch 2045 and a pulling device 2044 may be provided and attached to one of the first hinge portions 601.

It should be noted that many alternatives are possible within the scope of the claims. For example, the cover portion 202 may be opened in a non-pivoting motion, e.g. a purely translational motion. Also, as alternatives to boom cranes, other types of service cranes may be used to open the cover portion, e.g. a jib crane. In addition, in addition to or instead of extending a crane boom, the cover portion may be opened by some other movement of the crane, e.g. a movement along a crane boom of a lifting device such as a crane hook to which the cover portion is attached. In some embodiments, the cover portion may be opened by means of an external crane, by means of some tool dedicated to assist the cover portion opening process, or even by hand. Instead of being mounted outside the cover and the cover portion, the hinge tool may be mounted inside the cover and the cover portion. In some embodiments, instead of hinge tools, permanently installed hinges may be provided. When opened, instead of being secured to a cooler, the cover portion may be secured to some other device or part of the nacelle, e.g. to a fastening bracket provided on the nacelle exterior.

The invention claimed is:

1. A method for opening a cover portion of a wind turbine comprising a nacelle mounted on top of a tower, the nacelle supporting a rotor and a generator connected to the rotor, the nacelle comprising a cover presenting an access opening, the cover portion being adapted to removably cover the access opening, the nacelle also comprising a service crane, the wind turbine also comprising a cooler mounted to the nacelle on an exterior of the nacelle, the method comprising attaching at least one hinge tool to the cover portion and to the cover, the at least one hinge tool presenting a swing joint, opening the cover portion in a pivoting motion around the swing joint using the service crane, and securing the opened cover portion to the cooler.

2. A method of opening a cover portion of a wind turbine comprising a nacelle mounted on top of a tower, the nacelle supporting a rotor and a generator connected to the rotor, the nacelle comprising a cover presenting an access opening, the cover portion being adapted to removably cover the access opening, the method comprising attaching at least one hinge tool to the cover portion of the wind turbine and to the cover, the at least one hinge tool presenting a swing joint.

3. The method according to claim 2, wherein attaching the at least one hinge tool comprises connecting the at least one hinge tool to the cover portion using at least one first fastening element, and connecting the at least one hinge tool to the cover using at least one second fastening element, whereby the swing joint is provided between the first and second fastening elements.

4. The method according to claim 2, wherein the attachment of the at least one hinge tool is performed so that the swing joint provides a substantially horizontal hinge line.

5. The method according to claim 1, wherein the at least one hinge tool is removably attached to the cover and the cover portion, while the cover portion covers the access opening.

6. The method according to claim 1, wherein attaching at least one hinge tool comprises attaching at least two hinge tools to the cover portion and to the cover, each presenting a swing joint, so that the swing joints present a common hinge line.

7. The method according to claim 2, wherein the method comprises opening the cover portion in a pivoting motion around the swing joint using the service crane.

8. The method according to claim 1, wherein the method comprises attaching at least one abutment device so as to be fixed in relation to the cover, and opening the cover portion in a pivoting motion around the swing joint until the cover portion abuts the abutment device.

9. The method according to claim 1, wherein the swing joint forms a hinge line, and the centre of gravity of the cover portion is located, when the cover portion is in the closed position, on a first side of a vertical plane being parallel with and intersecting the hinge line, and the abutment device is positioned in relation to the swing joint so that when the cover portion abuts the abutment device, the centre of gravity of the cover portion is located on the first side of said vertical plane.

10. The method according to claim 2, wherein a cooler is mounted to the nacelle on an exterior of the nacelle, the method comprises opening the cover portion in a pivoting motion around the swing joint, and securing the opened cover portion to the cooler.

11. The method according to claim 1, wherein after the attachment of the at least one hinge tool, the cover portion is opened in a pivoting motion around the swing joint, and subsequently the cover portion may be closed in a pivoting motion around the swing joint.

12. A method for opening a cover portion of a wind turbine comprising a nacelle mounted on top of a tower, the nacelle supporting a rotor and a generator connected to the rotor, the nacelle comprising a cover presenting an access opening, the cover portion being adapted to removably cover the access opening, the nacelle also comprising a service crane, the method comprising opening the cover portion from a closed position wherein the cover portion is in contact with the nacelle and covering the access opening to an open position wherein the cover portion is moved away from the nacelle to expose the access opening, using the service crane.

13. The method according to claim 12, wherein opening the cover portion comprises opening the cover portion in a pivoting motion around a hinge line.

14. The method according to claim 12, wherein the cover portion is allowed to undergo the pivoting motion until the cover portion abuts an abutment device which is fixed in relation to the cover.

15. The method according to claim 12, wherein the service crane is a boom crane comprising a boom extending from a crane base.

16. The method according to claim 15, wherein the boom is a telescoping boom, and opening the cover portion comprises extending the boom.

17. The method according to claim 12, wherein the service crane is a boom crane mounted inside the nacelle.

18. The method according to claim 12, wherein a cooler is mounted to the nacelle on an exterior of the nacelle, and the method comprises securing the opened cover portion to the cooler.

19. A method for opening a cover portion of a wind turbine comprising a nacelle mounted on top of a tower, the nacelle supporting a rotor and a generator connected to the rotor, the nacelle comprising a cover presenting an access opening, the cover portion being adapted to removably cover the access opening, a cooler being mounted to the nacelle on an exterior of the nacelle, the method comprising opening the cover portion, and securing the opened cover portion to the cooler.

20. The method according to claim 19, wherein an auxiliary fence is temporarily mounted at least partly around the access opening.

21. The method according to claim 19, wherein opening the cover portion comprises opening the cover portion in a pivoting motion around a hinge line.

22. The method according to claim 21, wherein the method comprises allowing the cover portion to undergo the pivoting motion until the cover portion abuts an abutment device which is fixed in relation to the cover.

23. The method according to claim 22, wherein the abutment device and the cooler is provided on the same side of the cover portion.

24. The method according to claim 19, wherein a winch with an elongated, flexible pulling device is attached to the cooler, and said opening of the cover portion and/or said securing of the opened cover portion to the cooler is done using the winch.

25. The method according to claim 1, wherein the cover portion is a roof panel of the nacelle.

26. The method according to claim 1, wherein at least a part of the cover portion forms at least a part of a helihoist platform of the nacelle.

27. A nacelle for a wind turbine, the nacelle comprising a cover presenting an access opening, and a cover portion being adapted to removably cover the access opening and to be opened in a pivoting motion around a hinge line, the nacelle also comprising a service crane having a boom extending from a crane base, wherein the hinge line and the crane base are located on opposite sides of the access opening, the service crane being arranged to be re-positioned while the boom is connected to the cover portion so as to pivot the cover portion around the hinge line.

28. The nacelle according to claim 27, wherein the service crane is arranged to be re-positioned.

29. The nacelle according to claim 27, wherein the boom is arranged to be re-positioned by at least one of the boom pivoting or telescoping, or by a winch being mounted to the boom being arranged to be operated.

\* \* \* \* \*